(12) United States Patent
Weiser

(10) Patent No.: US 7,740,177 B2
(45) Date of Patent: Jun. 22, 2010

(54) SOLAR LIGHT STICK

(75) Inventor: Isaac Weiser, Tarzana, CA (US)

(73) Assignee: Exhart Environmental Systems, Inc., Chatsworth, CA (US)

( * ) Notice: Subject to any disclaimer, the term of this patent is extended or adjusted under 35 U.S.C. 154(b) by 915 days.

(21) Appl. No.: 11/584,055

(22) Filed: Oct. 20, 2006

(65) Prior Publication Data

US 2008/0117648 A1    May 22, 2008

(51) Int. Cl.
  *G06K 7/10* (2006.01)
(52) U.S. Cl. ............................. 235/462.49; 235/472.01
(58) Field of Classification Search ...............................
  235/472.01–472.03, 462.01, 462.25, 454,
  235/455, 4; 362/183, 235, 120, 232, 102,
  362/291, 555
  See application file for complete search history.

(56) References Cited

U.S. PATENT DOCUMENTS

| | | | |
|---|---|---|---|
| 4,195,907 A | 4/1980 | Zamja et al. | |
| 4,422,719 A | 12/1983 | Orcutt | |
| 4,466,697 A | 8/1984 | Daniel | |
| 5,036,443 A * | 7/1991 | Humble et al. | 362/183 |
| 5,117,472 A | 5/1992 | Blyler, Jr. et al. | |
| 5,257,329 A | 10/1993 | Blyler, Jr. et al. | |
| 5,579,429 A | 11/1996 | Naum | |
| 5,782,552 A | 7/1998 | Green et al. | |
| 5,857,761 A | 1/1999 | Abe et al. | |
| 6,030,108 A | 2/2000 | Ishiharada et al. | |
| 6,215,947 B1 | 4/2001 | Abramowicz et al. | |
| 6,301,418 B1 | 10/2001 | Freier et al. | |
| 6,304,712 B1 | 10/2001 | Davis | |
| 6,481,148 B1 | 11/2002 | Lindgren | |
| 6,857,771 B2 | 2/2005 | Guerrieri | |
| 7,267,453 B2 * | 9/2007 | Chang et al. | 362/120 |
| 2003/0081431 A1 * | 5/2003 | Brunfeld | 362/582 |
| 2004/0156955 A1 * | 8/2004 | Klima | 426/104 |
| 2006/0044817 A1 * | 3/2006 | Terry | 362/500 |
| 2006/0126860 A1 * | 6/2006 | Sievers et al. | 381/77 |
| 2006/0227534 A1 * | 10/2006 | Chang et al. | 362/102 |
| 2009/0168419 A1 * | 7/2009 | Daimon | 362/235 |

* cited by examiner

*Primary Examiner*—Thien M Le
(74) *Attorney, Agent, or Firm*—Cislo & Thomas, LLP

(57) ABSTRACT

A solar light stick for use as a lawn or garden novelty. The solar light stick has a support member, a solar panel, a rechargeable battery, an LED, and a wand. The wand contains a light transmissive material that may be transparent or translucent. The solar panel charges the rechargeable battery which, in turn, provides power to the LED. The LED is positioned to provide light to the interior of the wand. As such, the LED may be located within a recess in the wand. Voids, such as interior bubbles, suspended objects, or surface irregularities may help to disperse light from the LED in a direction external to the wand.

3 Claims, 4 Drawing Sheets

SOLAR LIGHT STICK

TECHNICAL FIELD

This invention relates to solar powered, lighted lawn ornaments.

BACKGROUND ART

People are often interested in providing decoration to their lawns, gardens, driveways, and sidewalks, and there are many existing devices directed toward this use. One such device is the driveway or walkway light. These small lights provide illumination and decoration and, as the description suggests, are generally placed alongside driveways or walkways. As such the devices are sometimes used to mark a path that is otherwise difficult to discern in low light conditions. However, these existing devices often require connection to an AC power source, intricate wiring between ornaments, expensive components, or energy inefficient incandescent or halogen light bulbs. Furthermore, they are often available in just one color of light: white.

There is therefore a need for a lighted lawn ornament that is simple in construction yet durable. There is further a need that the ornament be constructed of relatively inexpensive materials so as to pose a minimal risk of theft. There is also a need that the ornament have no external electrical hookups, and that the emanated light be of various colors.

DISCLOSURE OF INVENTION

The present invention is directed to a solar light stick for use as a lawn or garden novelty. The solar light stick has a support member, a solar panel, a rechargeable battery, an LED, and a wand. The wand contains a light transmissive material that may be transparent or translucent. The solar panel charges the rechargeable battery which, in turn, provides power to the LED.

The LED is positioned to provide light to the interior of the wand. As such, the LED may be located within a recess in the wand. Voids, such as interior bubbles, suspended objects, or surface irregularities may help to disperse light from the LED in a direction external to the wand.

BEST MODE FOR CARRYING OUT THE INVENTION

Figure 1:
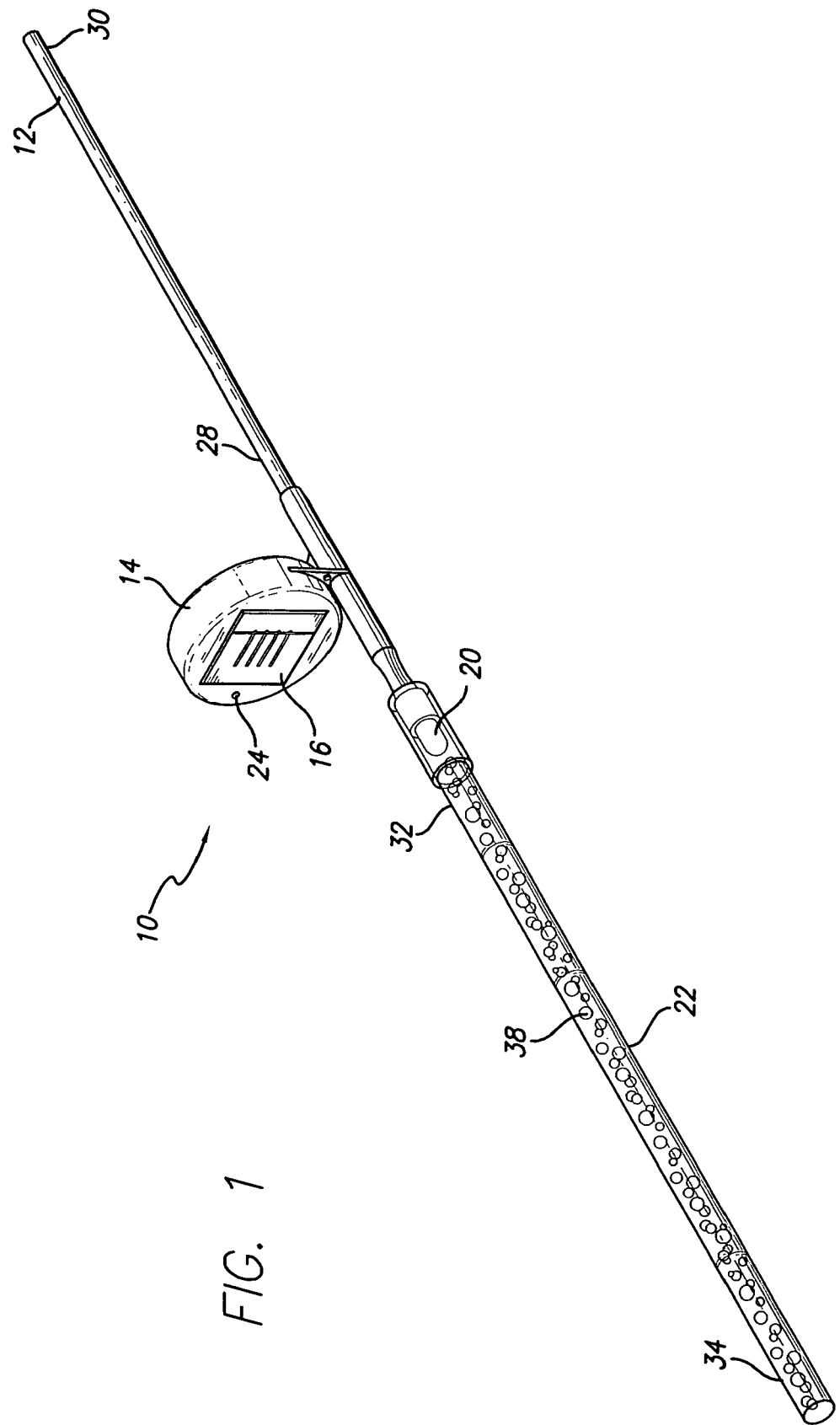
FIG. 1 is a perspective view of an embodiment of a solar light stick.
Figure 2:
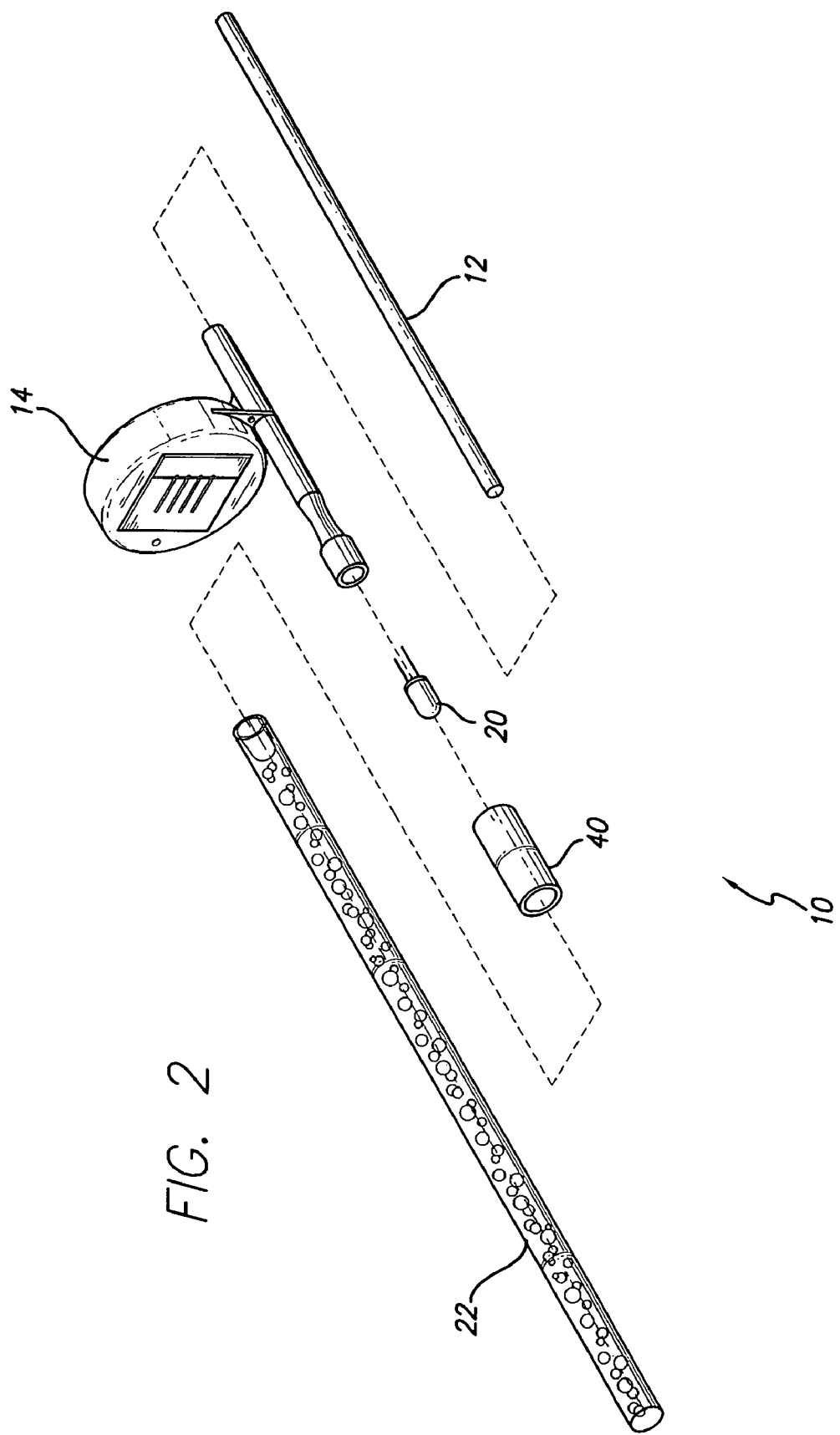
FIG. 2 is an exploded view of an embodiment of a solar light stick.
Figure 3:
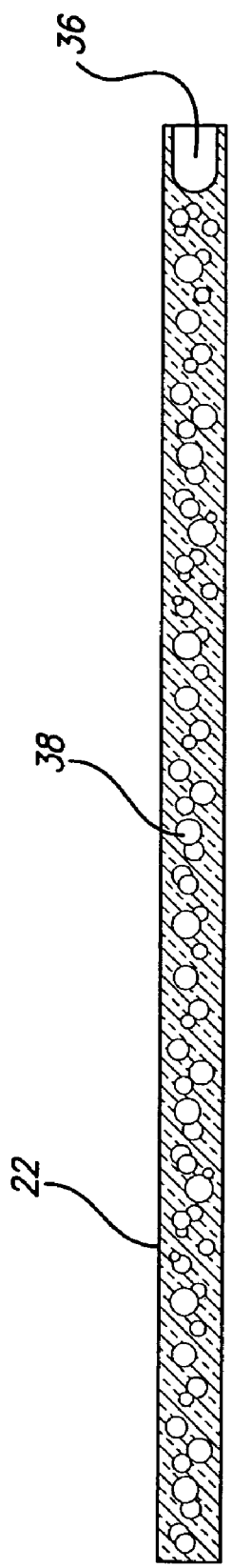
FIG. 3 is a sectional view of a wand of an embodiment of a solar light stick.
Figure 4:
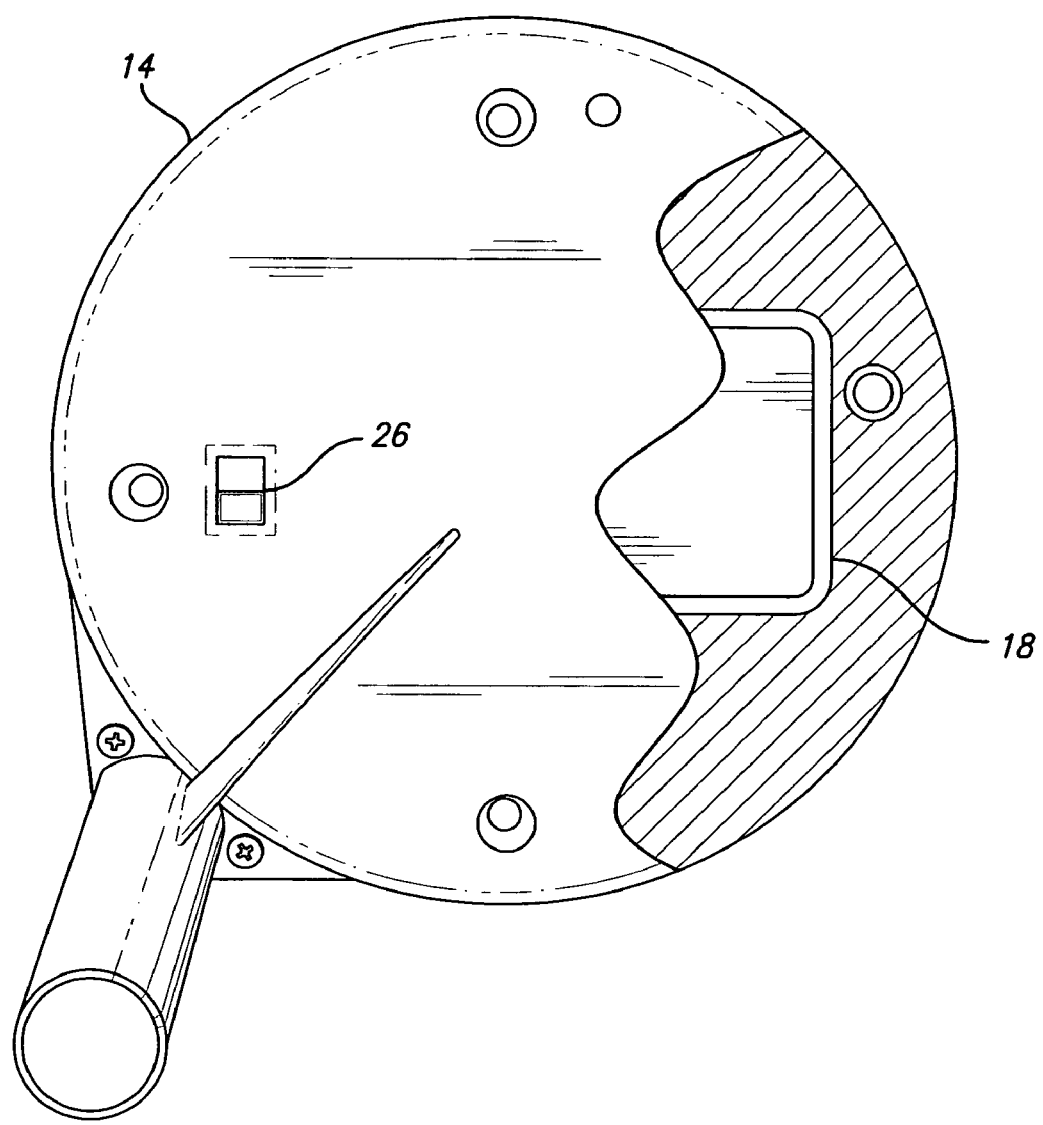
FIG. 4 is a rear perspective view of a housing of an embodiment of a solar light stick.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Referring to the figures, the present invention is directed to a solar light stick 10 for use as a lawn or garden novelty. The solar light stick 10 has a support member 12, a housing 14, a solar panel 16, a rechargeable battery 18, an LED 20, a wand 22, an ambient light sensor 24, and an on-off switch 26.

The support member 12 has an upper end 28 and a lower end 30. The lower end 30 may be inserted into the ground to install the solar light stick 10 in a lawn or garden. In a version of the invention, the support member 12 may be an elongated member, such as an aluminum rod or tube, extending from the housing 14. The support member 12 may also be made from other materials such as plastic, composites, and other metals such as stainless steel.

The wand 22 may contain acrylic, another plastic, glass, or another light transmissive material that may be transparent or translucent, and the wand 22 may be rigid or flexible. In an embodiment of the invention, the wand 22 may have a smooth, cylindrical surface and may be about ten inches in length. However, it is equally contemplated that the wand 22 may have a polygonal cross-section. Non-elongated shapes are also contemplated for the wand 22, such as novelty figurines and holiday related shapes. The wand 22 may contain voids, such as interior bubbles 38, to disperse light from the LED 20. In some embodiments, the wand 22 may have shaped objects suspended within it to disperse the light from the LED 20. Such shapes might be, for example, ribbons, strips, stars, hearts, cubes, squares, triangles, spheres, tubes, and similar geometric forms, either in their usual profiles or altered, such as by twisting, to improve light dispersal. It is also contemplated that the wand 22 may have surface depressions or irregularities such that the non-smooth surface may disperse light from the LED 20.

The wand 22 is connected to a portion of the housing 14. The connection may be by way of a ferrule 40, collet, or bushing, such as section of rubber or plastic hose, the ferrule 40 having an inside diameter to permit it to fit snugly over the outside dimension of the wand 22 and at least a portion of the housing 14.

The wand 22 may further have a recess 36, slot, pocket, or channel at the end proximal the housing 14. The recess 36 is sized, shaped, and dimensioned to accommodate the LED 20. The wand 22 may be oriented in an upright fashion, as is depicted in the figures. It is also contemplated that the wand 22 may be oriented in other directions, such as horizontally, obliquely, or even an array of wands 22 and other geometric and novelty shapes projecting in different directions from one or more LED's 20 connected to a common support member 12.

The LED 20 may be a standard light emitting diode and it may be a super bright LED. The LED 20 may emit light of various colors such as white, green, red, blue, amber, and others. It is also contemplated that other small light bulbs or other light sources may be used with the device.

The LED 20 is positioned to provide light to the interior of the wand 22. For example, the LED 20 may be located within the recess 36. In this way, the light from the LED 20 may be directed, at least in part, along the length of the wand 22. Voids such as interior bubbles 38, suspended objects, or surface irregularities may help to disperse light from the LED 20 in a direction other than along the length of the wand 22, and especially in a direction external to the wand. Thus, the light from the LED 20 may be more visible to an observer of the solar light stick 10. In some embodiments, the LED 20 may be connected to the housing 14.

The housing 14 may contain a solar power generator, which may include the solar panel 16 and the rechargeable battery 18. The solar panel 16 is positioned such that, when the solar light stick 10 is installed in the ground, the solar panel 16 may receive ambient light from the sun or another light source. In turn, the solar panel 16 charges the rechargeable battery 18.

The housing 14 may further contain an ambient light sensor 24. The ambient light sensor 24 may function to permit activation of the LED 20 during periods of low ambient light (e.g. nighttime) and may prevent activation of the LED 20 during periods of high ambient light (e.g. daytime). The relative low and high levels of ambient light may be set by a predetermined ambient light threshold.

The housing 14 may also contain an on-off switch 26. In the "on" or "auto" position, the on-off switch 26 permits the ambient light sensor 24 to activate the LED 20. In the "off" position, the on-off switch 26 prevents the ambient light sensor 24 from activating the LED 20. In embodiments not having the ambient light sensor 24, when "off" the on-off switch 26 prevents the rechargeable battery 18 from providing electrical power to the LED 20. Similarly, when "on" the on-off switch 26 permits the rechargeable battery 18 to provide electrical power to the LED 20. As an optional element, it is contemplated that some embodiments of the invention will not have an on-off switch 26, even if the embodiment does have an ambient light sensor 24.

To use the solar light stick 10, the support member 12 is inserted into the ground on a user's lawn or garden or adjacent to the person's driveway or walkway. More than one solar light stick 10 may be placed in various locations in a user's lawn or garden to create various ornamental designs and lighting effects. The solar light stick 10 is positioned such that the solar panel 16 may receive ambient light from the sun or another light source. If equipped, the on-off switch 26 may be placed in the "on" or "auto" position. The solar panel 16 converts the energy absorbed from the ambient light into electrical potential in the rechargeable battery 18 through methods known in the art. Once the rechargeable battery 18 has sufficient electrical potential and when the ambient light is below a preset amount (such as after sunset), the rechargeable battery 18 provides power to the LED 20, and the LED 20 illuminates. When the ambient light is above a preset amount (such as after sunrise), the electrical connection between the rechargeable battery 18 and the LED 20 is opened, and the LED 20 is extinguished.

While the present invention has been described with regards to particular embodiments, it is recognized that additional variations of the present invention may be devised without departing from the inventive concept.

INDUSTRIAL APPLICABILITY

This invention may be applied to the manufacture and use of solar powered, lighted lawn ornaments.

What is claimed is:

1. A solar light stick for use as a lawn novelty, comprising:
   (a) a support member, the support member having an upper end and a lower end, the support member comprising a tube;
   (b) a housing at the upper end of the support member;
   (c) a solar panel connected to the housing such that the solar panel may be exposed to ambient light;
   (d) a rechargeable battery within the housing and in electrical communication with the solar panel;
   (e) an LED connected to the rechargeable battery;
   (f) a wand, the wand having a proximal end and a distal end, the wand comprising a rigid, clear plastic and having a smooth, cylindrical surface, the wand having a recess at its proximal end, the LED being located within the recess at the proximal end of the wand, the wand containing interior bubbles to disperse the light from the LED;
   (g) an ambient light sensor within the housing; and
   (h) an on-off switch within the housing and in electrical communication with the LED.

2. A light stick for use as a lawn novelty, comprising:
   (a) a support member;
   (b) a solar panel connected to the support member;
   (c) a rechargeable battery connected to the solar panel;
   (d) a light source connected to the rechargeable battery, the light source emitting light; and
   (e) a wand, the wand comprising a light transmissive material, the wand having an interior and an exterior, the wand being located adjacent the light source such that the light emitted from the light source provides light to the interior of the wand, the wand containing interior bubbles to disperse the light from the light source.

3. A method of using a lighted ornament, comprising the steps of:
   (a) providing a lighted ornament having
      1. a solar power generator;
      2. an LED connected to the solar power generator; and
      3. a wand, the wand comprising a light transmissive material, the wand having an interior and an exterior, the wand being located adjacent the LED such that the light emitted from the LED provides light to the interior of the wand, the provided wand containing bubbles to disperse the light emitted from the LED;
   (b) locating the lighted ornament by selecting a location where the solar power generator will receive ambient light;
   (c) providing electrical power to the LED via the solar power generator; and
   (d) illuminating the LED as a result of the provided electrical power.

* * * * *